Dec. 22, 1959 D. L. CURTIS 2,918,586

TRANSISTOR MULTIVIBRATOR

Filed Nov. 18, 1955 2 Sheets-Sheet 1

DANIEL L. CURTIS,
INVENTOR

BY Henry Heyman
ATTORNEY

Dec. 22, 1959 D. L. CURTIS 2,918,586

TRANSISTOR MULTIVIBRATOR

Filed Nov. 18, 1955 2 Sheets-Sheet 2

DANIEL L. CURTIS,
INVENTOR

BY Henry Heyman
ATTORNEY

United States Patent Office 2,918,586

Patented Dec. 22, 1959

2,918,586

TRANSISTOR MULTIVIBRATOR

Daniel L. Curtis, Manhattan Beach, Calif., assignor to Hughes Aircraft Company, Culver City, Calif., a corporation of Delaware Application November 18, 1955, Serial No. 547,829

1 Claim. (Cl. 307—88.5)

This invention relates generally to multivibrators and, more particularly, to a transistor flip-flop employing transformers for interstage coupling and for producing an output signal.

Flip-flops which are astable, monostable, or bistable in operation are well known in the art, including both vacuum tube and transistor multivibrators. Of the more common transistor flip-flops presently in use are those described by R. F. Shea in his book, "Principles of Transistor Circuits," published 1954 by John Wiley & Sons, New York, New York, with particular reference to pages 289 and 299. Another transistor flip-flop which is currently in popular use and which employs point-contact transistors is shown and described in Air Force Cambridge Research Center Technical Report 53-16, entitled, "High Speed Transistor Flip-flops," by A. W. Carlson, published June 1953.

Most of the transistor flip-flops which are disclosed in the prior art require direct coupling to any load which is to be driven, as for example, a diode resistor gate, a magnetic recording or reading head, or the like. When direct coupling is used in a transistor flip-flop, several disadvantages are inherently present. The first and most important of these is the difficulty in matching the output impedance to the load impedance which is desired in order to obtain optimum transfer of power. If a mismatch of these impedances occurs, it may cause a large amount of current to flow through the semiconductor body of the transistor. Second, large current flowing through the transistor body causes a reduction in sensitivity to the applied input pulses which may be utilized for triggering of the flip-flop. This reduced sensitivity results in requiring a larger amount of power of the triggering pulses to obtain proper flip-flop operation.

In order to achieve the greatest utilization of a flip-flop, particularly when it is employed in a digital computer, the ratio of the flip-flop output power to the input power required for triggering should be as large as possible. This ratio with the typical flip-flops in the present art is of the order of 40 to 1.

Accordingly, an object of the present invention is to provide a flip-flop which has high sensitivity to input triggering signals.

Another object of the present invention is to provide a transistor flip-flop for producing alternating current output signals.

A further object of the present invention is to provide a transistor flip-flop which transfers maximum power to a load while maintaining optimum operation of the multivibrator.

A still further object of the present invention is to provide a transistor flip-flop having a ratio of output power to input power of about 1,000 to 1.

A flip-flop in accordance with the present invention includes a multivibrator having connected to it means for applying an input signal which contains the information to be stored as well as means for applying a sampling or readout signal. The primary of a transformer is connected to the output of the multivibrator for developing an output signal which is applied by way of the transformer secondary winding to a driver stage. An additional transformer is connected to the driver stage for producing an output signal which is applied to a load.

The novel features of the present invention are set forth with particularity in the appended claim. Other and more specific objects of the present invention will become apparent from a consideration of the following description taken in conjunction with the accompanying drawings wherein like components are represented by the same reference characters and in which:

Figure 1:
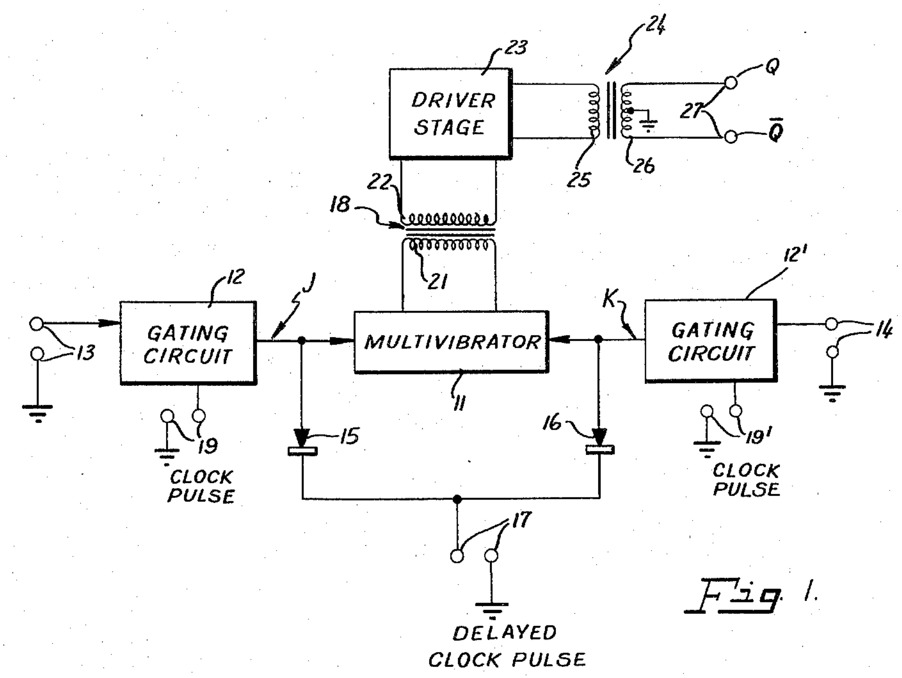
Fig. 1 is a schematic diagram in block form of a flip-flop of the present invention.

Referring now to the drawings and, more particularly, to Fig. 1, there is shown a multivibrator represented by rectangle 11. This multivibrator may be either bistable or astable. If it is astable, the time between a natural change from one state to the other must be greater than one clock pulse interval. Gating circuit 12 is connected between one input of multivibrator 11 and input terminals 13, one of which is grounded. Another gating circuit 12′ is connected between the other input of multivibrator 11, and input terminals 14, one of which is grounded. Gating circuits 12 and 12′ may be any of the conventional diode-resistor or transistor gates which are currently known in the art. Furthermore, the gating circuits may perform the functions known in Boolean algebra as "and," "or," or any combination thereof depending upon the particular application of the multivibrator. Master timing signals sometimes referred to as clock pulses may be appled to input terminals 19 and 19′ of the gating circuits, 12 and 12′, respectively, as shown. One type of diode resistor gate which may be used for gating circuits 12, 12′ has been disclosed and claimed in co-pending U.S. patent application entitled, "Diode Pulse Gating Circuits," by Richard D. Forrest, Serial No. 327,-133, filed December 20, 1952, now U.S. Patent No. 2,762,936, and assigned to the assignee of this application.

The gating system which is preferred for use with the flip-flop of the present invention and which fully utilizes the transformer output coupling is disclosed and claimed in co-pending U.S. patent application entitled "Logical Decision Circuitry for Digital Computation," Serial No. 547,830, filed concurrently herewith by Daniel L. Curtis, and assigned to the assignee of this application.

Connected between one input of multivibrator 11 and input terminals 17, one of which is grounded, is a diode 15. Another diode 16 is connected between the other input of multivibrator 11 and input terminals 17. Diodes 15 and 16 are poled and utilized to apply a negative-going sampling or read-out signal referred to as a delayed clock pulse signal to multivibrator 11. Application of the delayed clock pulse to multivibrator 11 causes it to change states during the normal clock pulse interval. It is this change of state that transmits the intelligence stored by the multivibrator and which enables use of transformer coupling at the multivibrator output.

Connected across the output of multivibrator 11 is a primary winding 21 of transformer 18. Secondary winding 22 is connected to a driver stage represented by rectangle 23. Transformer 18 is used to match the output impedance of multivibrator 11 to the input impedance of driver stage 23, thus allowing optimum transfer of power from the multivibrator to the driver stage. Primary winding 25 of transformer 24 is connected across the output of driver stage 23. Secondary winding 26 may have its midpoint grounded as shown and is utilized to produce an output signal which may be obtained at terminals 27 thereof. Transformer 24 is used to develop the desired output voltage swing while maintaining the available power in the signal essentially a constant. In this manner the ratio of the output power to input power is caused to be of the order of 1,000 to 1. If direct coupling were used in place of transformer 24, clamping diodes would have to be used to obtain the proper voltage swing. Since the current of the output signal would remain essentially constant, the available output power would be reduced.

Figure 2:
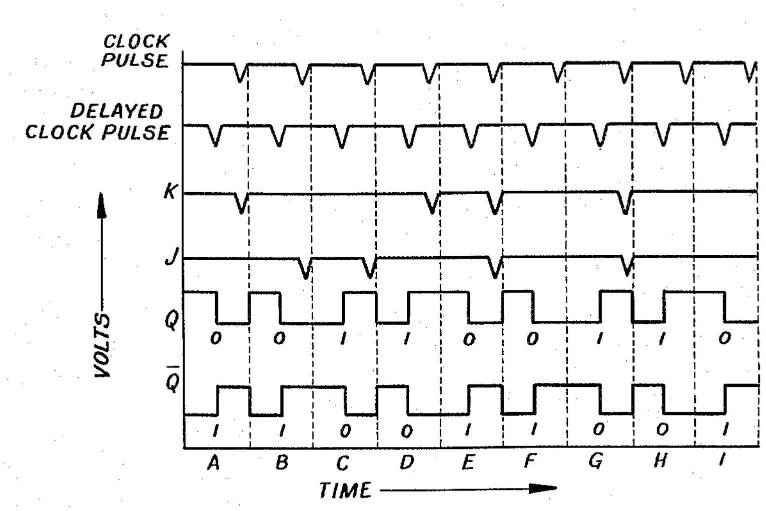
Fig. 2 is a graph illustrating waveforms taken at various points throughout the circuit of Fig. 1.

In discussing the operation of the circuit as shown in Fig. 1, reference is now made to Fig. 2 wherein the abscissa represents time and the ordinate voltage. The delayed clock pulse waveform was taken by measuring across input signal terminals 17 while the clock pulse waveform was taken at terminals 19 and 19'. Waveforms K and J were taken by measuring between the output of gating circuits 12' and 12, respectively, and ground as indicated by the symbols K or J on Fig. 1. Output signals Q and $\bar{Q}$ may be obtained between output terminals 27 and ground as indicated on Fig. 1.

The letters A through I along the abscissa of Fig. 2 represent clock pulse intervals of time—that is, that interval of time which elapses between the application of each master timing signal. It will be noted that the delayed clock pulse is applied sometime during the clock pulse interval but after application of the clock pulse. Although it is shown on Fig. 2 as being applied at the center of each clock pulse interval, this is not necessary.

The information conveyed by the signals Q and $\bar{Q}$ is represented by a change from either a high to a low state or a low to a high state of the signals Q and $\bar{Q}$ in response to application of the delayed clock pulse signal to multivibrator 11 during the clock pulse interval. If binary representation is to be employed it may be arbitrarily assumed for purposes of discussion only that a change of signals Q and $\bar{Q}$ from a high state to a low state upon application of the delayed clock pulse represents binary zero, while a change from a low state to a high state represents a binary one as is indicated by the zeros and ones placed beneath the signals Q and $\bar{Q}$ on Fig. 2. Since the signals Q and $\bar{Q}$ are complementary to each other, the following discussion will be limited to output signal Q only.

Each of the clock pulse intervals represented on Fig. 2 shows one series of events which may occur during operation of the circuit shown in Fig. 1 and the result of these events. For example, if neither input signal K nor J is present during a clock pulse interval and thus not applied to multivibrator 11, the only change in signal Q that will occur is upon application of the delayed clock pulse as indicated at clock pulse intervals H and I. As another example, assuming output signal Q is in its low state and a signal J is applied to multivibrator 11, or output signal Q is in its high state and a signal K is applied to multivibrator 11, signal Q remains in its previous state as shown at the termination of clock pulse intervals B and D, respectively. However, if signal Q is in its high state and a signal J is applied to multivibrator 11, Q will change to its low state as indicated at the termination of clock pulse interval C. If output signal Q is in its low state and a signal K is applied, Q will change to its high state as indicated at the termination of clock pulse interval A. If signals K and J are applied simultaneously to multivibrator 11, output signal Q will change from one state to the other, depending upon its previous state as indicated at the termination of clock-pulse intervals E and G.

Figure 3:
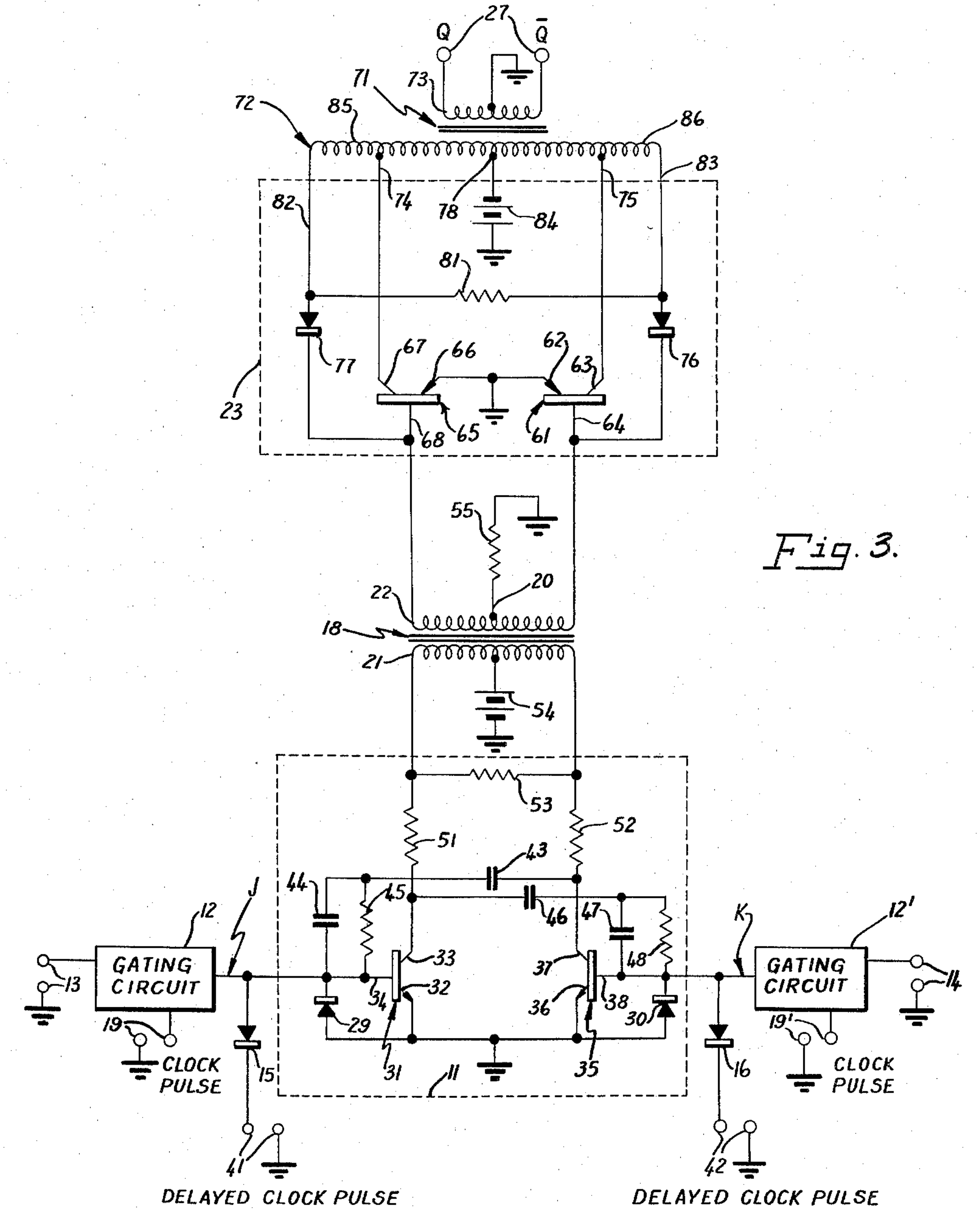
Fig. 3 is a schematic circuit diagram of a preferred embodiment of the flip-flop of the present invention.

Referring now more particularly to Fig. 3, the multivibrator represented by dashed rectangle 11 is shown to include a transistor 31 having an emitter 32, a collector 33, and a base 34. Also shown is a transistor 35 having an emitter 36, a collector 37, and a base 38. Transistors 31 and 35 may be, for example, N–P–N junction type transistors as indicated by the conventional schematic symbol used. However, it is to be understood that P–N–P type transistors may be used by reversing the polarity of all applied voltages which are hereinafter described.

Diode 29 has its cathode connected to base 34 and its anode connected to emitter 32, while diode 30 has its cathode connected to base 38 and its anode connected to emitter 36. Gating circuit 12 is connected between input terminals 13 and base 34, while gating circuit 12' is connected between input terminals 14 and base 38. Diodes 15 and 16 are connected between base 34 and input terminals 41 and base 38 and input terminals 42, respectively, and are poled to pass a negative-going signal. This indicates that the delayed clock pulse signal may be applied individually to each transistor as well as being applied simultaneously to each transistor as indicated in Fig. 1. However, if this is done, two additional diodes which are not shown must be used to steer the delayed clock pulse signal to the proper transistor. These additional circuits increase the overall efficiency of the multivibrator triggering by about 30% and are, therefore, desirable in some applications.

A coupling network consisting of series connected capacitors 43 and 44 and resistor 45 which is connected in parallel with capacitor 44 is connected between collector 37 and base 34. Another cross-coupling network consisting of capacitors 46 and 47 and resistor 48 which is connected in parallel with capacitor 47 is connected between collector 33 and base 38. Each of the cross-coupling networks supplies a regenerative feedback signal from one transistor to the other which causes the two transistors to change from one of their states to the other in response to the application of an input signal from either of the gating circuits or the delayed clock pulse source.

Resistors 51, 52, and 53 are connected in series between collectors 33 and 37. Primary winding 21 of transformer 18 is connected across resistor 53. A source of operating potential for transistors 31 and 35 such as battery 54 is connected between the center tap of primary winding 21 and ground. Center tap 20 of secondary winding 22 has a resistor 55 connected between it and ground. Resistors 51, 52, 53, and 55 are utilized to keep transformer 18 from ringing, that is, the inductance in each half of the two windings in conjunction with the distributed and stray capacitance is prevented from going into oscillations due to the switching action of transistors 31 and 35.

The driver stage which is represented by dashed rectangle 23 is shown to include a transistor 61 having an emitter 62, a collector 63, and a base 64. It also includes another transistor 65 having an emitter 66, a collector 67, and a base 68. Transistors 61 and 65 may, for example, be P–N–P junction transistors as shown. Emitters 62 and 66 are connected together and returned to ground. Secondary winding 22 of transformer 18 is connected across bases 64 and 68.

Transformer 18 is used to match the collector impedance of transistors 31 and 35 to the base impedance of transistors 61 and 65. This permits optimum transfer of power and allows transistors 31 and 35 to supply necessary power to transistors 61 and 65 without conducting heavily. This in turn increases the sensitivity of the transistors to the applied trigger pulses. Since transistors 31 and 35 do not conduct heavily, only a slight amount of collector saturation is present. For this reason the time delay in the switching of transistors 31 and 35 from one state to the other in response to the application of input signals is negligible.

An output transformer 71 having a primary winding 72 and a secondary winding 73 is used to produce output signals from the driver stage at the desired voltage level and to couple them to any load which may be used.

Primary winding 72 includes intermediate taps 74 and 75, a center tap 78, and terminals 82 and 83. Collectors 63 and 67 are connected to intermediate taps 75 and 74 of primary winding 72, respectively. A diode 76 is connected between terminal 83 and base 64, while another diode 77 is connected between terminal 82 and base 68. Diodes 76 and 77 are poled to pass a positive-going signal from primary winding 72 to bases 64 and 68, respectively, and in conjunction with the terminal portions 85 and 86 of primary winding 72 provide a feedback path for each of transistors 61 and 65.

By use of these feedback paths the transistors are prevented from going into collector saturation. If this feedback were not used, minority carrier storage would introduce an undesirable delay in the production of output signals Q and $\bar{Q}$ in response to a change of state of the transistors within multivibrator 11. The minority carrier storage phenomenon is discussed at length in "Proceeding of the I.R.E.," December 1954, in an article by John L. Moll, entitled "Large-Signal Transient Response of Junction Transistors," on page 1773.

A source of operating potential for transistors 61 and 65, such as battery 84, is connected between center tap 78 and ground. A resistor 81 is connected between terminals 82 and 83 of primary winding 72 and is used to keep transformer 71 from ringing. Secondary winding 73 of transformer 71 also has a center tap which is grounded.

As a first example of operation of the circuit of Fig. 3, assume that transistor 35 is conducting and transistor 31 is non-conducting, thus causing output signal Q appearing at output terminals 27 to be in its low state and $\bar{Q}$ in its high state as hereinafter explained. If a negative-going signal K which is a composite of an intelligence signal and a clock pulse signal that are concurrently applied to gating circuit 12' is then applied to base 38 of transistor 35, transistor 35 would begin to become non-conducting. This decrease in conduction causes a rise in potential at collector 37. This rise in potential is coupled by way of capacitors 43 and 44 and resistor 45 to base 34 of transistor 31. This rise in potential causes the cathode of diode 29 to become more positive than its anode, thus causing it to be non-conducting. This, in turn, causes the rise in potential of collector 37 to be applied directly to base 34. Transistor 31 then begins to become conducting, which results in a decrease in potential present upon collector 33. This decrease in potential is coupled by way of capacitors 46 and 47 and resistor 48 to base 38 of transistor 35, thus causing it to become still less conducting.

This process continues in a regenerative fashion until transistor 35 becomes completely non-conducting and transistor 31 becomes completely conducting; thus transistors 31 and 35 have reversed their states of operation.

When transistor 35 becomes completely non-conducting, the feedback signal which is applied from collector 33 of transistor 31 to base 38 of transistor 35 by way of the cross-coupling network causes the cathode of diode 30 to become more negative than its anode, thus causing diode 30 to become conducting. While transistor 35 was conducting, diode 30 was non-conducting. Thus, it is evident that whether the particular transistor with which diode 29 or 30 is associated is conducting or non-conducting, the cross-coupling network associated therewith sees essentially a constant impedance. In the one instance it will be the forward biased base-to-emitter impedance of the transistor, and in the other instance the forward biased impedance of the diode. Therefore, the feedback signal will appear essentially as a constant current having a reversing polarity. Diodes 29 and 30 should be chosen to have essentially the same characteristics as the base-to-emitter section of the transistor with which it is associated.

The regenerative switching of transistors 31 and 35 induces a signal in secondary 22 of transformer 18. If the polarity of the signal induced in secondary winding 22 is such as to apply a negative potential to base 64 of transistor 61 and a positive potential to base 68 of transistor 65, transistor 61 will become conducting and transistor 65 non-conducting. This causes current to flow through primary winding 72 in such a direction as to induce a signal in secondary winding 73 such that output signal Q changes to its high state. This series of events is illustrated graphically at the termination of clock pulse interval A in Fig. 2.

If transformer 18 were not used the output impedance of multivibrator 11 could not be matched to the input impedance of driver stage 23. Since in a direct-coupled connection the collector current of the multivibrator would inherently have to be more than the base current of the driver stage, transistors 31 and 35 would have to be heavily loaded to supply sufficient current to produce the desired output signal. This would impair the sensitivity of the multivibrator to the applied input signals. However, by the use of transformer 18 as an interstage coupling device the collector current of the multivibrator transistors may be much less than the base current of those of the driver stage, thus allowing transistors 31 and 35 to remain sensitive to the applied input signal while producing the desired output signal.

If it becomes desirable to read the information which is stored by multivibrator 11, a delayed clock pulse signal such as that shown during clock pulse interval B may be applied simultaneously to the bases of transistors 31 and 35.

Since transistor 35 is presently non-conducting, the application of the delayed clock pulse signal will have no effect on it. However, the negative-going delayed clock pulse causes transistor 31 to become less conducting which in turn starts the regenerative process above described with the result that the transistors change their state of operation.

The change in state of the transistors causes the polarity of the potential present on the secondary winding of transformer 18 to reverse. This, in turn, causes transistor 61 to become non-conducting and transistor 65 to become conducting, which reverses the state of output signal Q from its high to its low state as shown during clock pulse interval B of Fig. 2. This change of state from high to low indicates a binary zero.

The reaction of multivibrator 11 to the application of various pulses thereto is represented by the remaining portions of the graph of Fig. 2.

Although it will be understood that the multivibrator of the present invention may be used in applications other than a digital computer, the following table is included by way of example only to indicate in tabular form the relationships between output signal $Q_n$ which is the present state of the multivibrator, $Q_{n-1}$ which is the immediately previous state of the multivibrator, and $J_{n-1}$ and $K_{n-1}$ which are previous states of the input signals J and K.

| Rule | $Q_{n-1}$ | $J_{n-1}$ | $K_{n-1}$ | $Q_n$ | Clock Pulse Interval |
|---|---|---|---|---|---|
| 1 | 0 | 0 | 0 | 1 | F-G |
| 2 | 0 | 0 | 1 | 0 | A-B |
| 3 | 0 | 1 | 0 | 1 | B-C |
| 4 | 0 | 1 | 1 | 0 | E-F |
| 5 | 1 | 0 | 0 | 0 | H-I |
| 6 | 1 | 0 | 1 | 0 | D-E |
| 7 | 1 | 1 | 0 | 1 | C-D |
| 8 | 1 | 1 | 1 | 1 | G-H |

The last column in Table I shows the time intervals as represented in Fig. 2 during which the relationships set forth by the particular rule existed. The first clock pulse interval shown is $n-1$ while the last interval shown is the present time interval $n$. As an example, rule 5 shows that when $Q_{n-1}=1$, $J_{n-1}=0$, $K_{n-1}=0$, as in clock pulse interval H, that $Q_n=0$ upon application of the delayed clock pulse signal in clock pulse interval I.

If steering diodes are used to control application of the input signals to multivibrator 11, rules 4 and 8 will not occur for the signals $J_{n-1}$ and $K_{n-1}$ will not be applied simultaneously to the multivibrator.

It will be understood that circuit specifications for the transformer-coupled transistor multivibrator shown in Fig. 3 may vary according to the design for any particular application. The following circuit specifications are included by way of example only, suitable for operation with a clock pulse interval of six microseconds.

| | |
|---|---|
| Transistors **31** and **35** | Germanium Products Co. Junction Transistor Type 2N99 (N-P-N). |
| Transistors **61** and **65** | General Electric Co. Junction Transistor Type 2N44 (P-N-P). |
| Resistors **51** and **52** | 1,000 ohms. |
| Resistors **53** and **81** | 10,000 ohms. |
| Resistors **45** and **48** | 68,000 ohms. |
| Resistor **55** | 5 ohms. |
| Capacitors **43** and **46** | .0047 micro-farad. |
| Capacitors **44** and **47** | 25 micro-microfarads. |
| Battery **54** | 15 volts. |
| Battery **84** | 22 volts. |
| Diodes **15**, **16**, **29**, **30**, **76**, and **77** | 1N67A. |
| Transformer **18** | Turns ratio each side of center tap—20:1. Inductance each side of center tap—40 millihenrys. |
| Transformer **71** | Turns ratio each side of center tap between intermediate terminals **82** and **83**—20:1. Sections **85** and **86** of primary winding **72**, 3:1. |

By using the components and voltages as listed above, output signals Q and $\bar{Q}$ will have a voltage swing of two volts and a current of one ampere. A gating system which operates with this type input signal is disclosed and claimed in the aforementioned co-pending application of Daniel Curtis.

There has thus been disclosed a preferred embodiment of a transformer-coupled transistor multivibrator which produces an alternating current output signal and which will transfer maximum power to a load while maintaining optimum performance of the multivibrator.

What is claimed as new is:

In a binary data conversion system, the combination comprising a transistor flip-flop circuit having a pair of interconnected three-element transistors with one winding of a first impedance-matching transformer coupled between collector elements of said pair of transistors, a resistive element connected in parallel with said one winding to damp oscillations, third and fourth three-element transistors with base elements respectively connected to another winding of said first transformer with a resistive element connected from a center tap of such winding to a common junction between emitter elements, a second impedance-matching transformer with one winding having two end terminals, a center tap, and two intermediate taps, said end terminals respectively coupled through diodes to the base elements of said third and fourth transistors with the diodes poled to pass only positive potentials at said end terminals, respective direct connections being made between collector elements of said third and fourth transistors and said intermediate taps, and operating potential means connected between said center tap of said one winding of said second transformer and said common junction, whereby output pulses are developed at another winding of said second transformer having a power ratio of substantially 1,000 to 1 with respect to input pulses to said flip-flop circuit.

References Cited in the file of this patent

UNITED STATES PATENTS

| | | |
|---|---|---|
| 2,157,533 | Geiger | May 9, 1939 |
| 2,422,449 | Usselman | June 17, 1947 |
| 2,605,306 | Eberhard | July 29, 1952 |
| 2,680,160 | Yeager | June 1, 1954 |
| 2,759,104 | Skellett | Aug. 14, 1956 |
| 2,785,236 | Bright et al. | Mar. 12, 1957 |